(12) United States Patent
Zeng et al.

(10) Patent No.: US 12,491,483 B2
(45) Date of Patent: Dec. 9, 2025

(54) METHOD FOR PREPARING HIGH-PRESSURE STATE MATERIAL CAPABLE OF BEING DETACHED FROM HIGH-PRESSURE DEVICE

(71) Applicant: CENTER FOR HIGH PRESSURE SCIENCE AND TECHNOLOGY ADVANCED RESEARCH, Beijing (CN)

(72) Inventors: Qiaoshi Zeng, Shanghai (CN); Zhidan Zeng, Shanghai (CN); Wendy L. Mao, Stanford, CA (US); Ho-Kwang Mao, Shanghai (CN)

(73) Assignee: CENTER FOR HIGH PRESSURE SCIENCE AND TECHNOLOGY ADVANCED RESEARCH, Beijing (CN)

( * ) Notice: Subject to any disclaimer, the term of this patent is extended or adjusted under 35 U.S.C. 154(b) by 0 days.

(21) Appl. No.: 18/002,093

(22) PCT Filed: Jun. 20, 2022

(86) PCT No.: PCT/CN2022/099695
§ 371 (c)(1),
(2) Date: Dec. 16, 2022

(87) PCT Pub. No.: WO2023/216365
PCT Pub. Date: Nov. 16, 2023

(65) Prior Publication Data
US 2024/0226837 A1    Jul. 11, 2024

(30) Foreign Application Priority Data
May 11, 2022    (CN) .......................... 202210515692.8

(51) Int. Cl.
*B01J 3/06* (2006.01)

(52) U.S. Cl.
CPC ........ *B01J 3/065* (2013.01); *B01J 2203/0625* (2013.01)

(58) Field of Classification Search
None
See application file for complete search history.

(56) References Cited

U.S. PATENT DOCUMENTS

| 2,992,900 A | * | 7/1961 | Bovenkerk | ............. C01B 32/26 425/DIG. 26 |
| 2,996,763 A | * | 8/1961 | Wentorf, Jr. | ............. B01J 3/065 425/DIG. 26 |

(Continued)

*Primary Examiner* — John J Figueroa
(74) *Attorney, Agent, or Firm* — MENDELSOHN DUNLEAVY P.C.; Kevin J. Dunleavy

(57) ABSTRACT

The present invention relates to the field of materials, in particular to a method for preparing a high-pressure state material that can be detached from a high-pressure device. The method comprising: placing a carbon material and a target material into a high-pressure device, and subjecting the resultant to high-temperature and high-pressure treatment to obtain a diamond high-pressure chamber containing a high-pressure state material inside. The present invention enables the high-pressure state material (including the substance and its pressure state) to be preserved inside the diamond high-pressure chamber by mixing the carbon material and the target material and placing into the sample chamber of a conventional high-pressure device, and then transforming the carbon material into diamond using the high-temperature and high-pressure treatment. The diamond high-pressure chamber can be separated from the conventional high-pressure device and maintain the high-pressure state inside, thus allowing the high-pressure material to be studied and applied in an atmospheric pressure environment.

17 Claims, 2 Drawing Sheets

(56) References Cited

U.S. PATENT DOCUMENTS

| | | | | | |
|---|---|---|---|---|---|
| 3,031,269 | A | * | 4/1962 | Bovenkerk | B01J 3/062 425/DIG. 26 |
| 3,536,447 | A | * | 10/1970 | Shinichiro | B01J 3/062 423/446 |
| 3,850,591 | A | * | 11/1974 | Wentorf, Jr. | B01J 3/062 51/307 |
| 4,034,066 | A | * | 7/1977 | Strong | B01J 3/062 501/86 |
| 4,128,625 | A | * | 12/1978 | Ishizuka | B01J 3/062 423/446 |
| 4,287,168 | A | * | 9/1981 | Wentorf, Jr. | B01J 3/065 422/240 |
| 4,322,396 | A | * | 3/1982 | Strong | B01J 3/065 422/240 |
| 4,340,576 | A | * | 7/1982 | Strong | B01J 3/062 422/240 |
| 5,244,368 | A | * | 9/1993 | Frushour | C04B 35/5831 425/DIG. 26 |
| 5,772,756 | A | * | 6/1998 | Davies | B01J 3/062 423/446 |
| 2006/0292302 | A1 | * | 12/2006 | Chodelka | C01B 32/26 427/523 |

* cited by examiner

METHOD FOR PREPARING HIGH-PRESSURE STATE MATERIAL CAPABLE OF BEING DETACHED FROM HIGH-PRESSURE DEVICE

CROSS-REFERENCE TO RELATED APPLICATION

The present application claims priority to Chinese Patent Application No. 202210515692.8, entitled "Method for preparing high-pressure state material capable of being detached from high-pressure device" filed on May 11, 2022, the entire disclosure of which is incorporated herein by reference in its entirety.

TECHNICAL FIELD

The invention relates to the field of high pressure materials, in particular to a method for preparing a high-pressure state material capable of being detached from a high-pressure device.

BACKGROUND ART

Extremely high pressure (refers to a physical environment with a pressure greater than one standard atmospheric pressure, hereinafter referred to as high pressure) can significantly change the structure and physical and chemical properties of materials. A large number of studies have shown that many new materials and excellent properties that cannot be obtained under atmospheric pressure can be obtained by using high pressure. For example, the thermoelectric properties, photoelectric properties, luminescent properties and superconducting properties of materials can be significantly enhanced under high pressure. In addition to traditional solid-phase materials, substances that are gaseous or liquid at atmospheric pressure will also be transformed into solids at high pressure. Many important breakthroughs have been made in the high-pressure research of these systems, such as the discovery of possible metallization of hydrogen at extreme high pressures, sulfur-hydrogen compounds with superconducting temperature as high as 203 K, carbon-sulfur-hydrogen compounds with superconducting temperature close to room temperature (15° C.), and the synthesis of polymeric nitrogen with high energy density at high temperature and high pressure.

However, these new materials synthesized under high pressure and their excellent properties often only exist in a high-pressure environment, undergo reversible changes after depressurization, and cannot be preserved to atmospheric pressure. The stable generation and maintenance of high pressure depend on high pressure devices such as diamond anvil cell and large volume press. Therefore, a large number of new materials synthesized under high pressure cannot be conveniently studied and applied in practice because they cannot exist independently from the high-pressure devices.

SUMMARY OF THE INVENTION

The purpose of the present invention is to provide a method for preparing a high-pressure state material that can be detached from a high-pressure device. By synthesizing a diamond high-pressure chamber, the present invention makes it possible to permanently preserve the high-pressure structure, physical properties and pressure of materials in a diamond high-pressure chamber detached from a conventional high-pressure device, making possible the atmospheric pressure application of high-pressure state materials.

The present invention provides a method for preparing a high-pressure state material that can be detached from a high-pressure device, comprising: placing a carbon material and a target material into a high-pressure device, and subjecting the resultant to high-temperature and high-pressure treatment to obtain a diamond high-pressure chamber containing a high-pressure state material inside.

The present invention enables the high-pressure state material (including the substance and its pressure state) to be preserved inside the diamond high-pressure chamber by mixing the carbon material and the target material and placing into the sample chamber of a conventional high-pressure device, and then transforming the carbon material into diamond using the high-temperature and high-pressure treatment. The diamond high-pressure chamber can be separated from the conventional high-pressure device and maintain the high-pressure state inside, thus allowing the high-pressure state material to be studied and applied in an atmospheric pressure environment. By preparing the diamond high-pressure chamber, the present invention solves the problem that the pressure state, high-pressure structure and physical properties of materials cannot be separated from the high-pressure device for preservation, thus enabling the study and application of high-pressure state materials in an atmospheric pressure environment.

In some embodiments of the present invention, the high-temperature and high-pressure treatment is performed at a pressure of 5 to 100 GPa and a temperature of 400 to 3000° C.

Further preferably, the high-temperature and high-pressure treatment is performed at a pressure of 25 to 50 GPa, a temperature of 1500 to 2000° C. and a holding time of 1 to 20 minutes.

In some embodiments of the present invention, the carbon material is one or more of graphite, carbon black, glassy carbon, graphene, fullerene, carbon nanotube, amorphous carbon, diamond and diamondoid.

In some embodiments of the present invention, the target material is a gas, a liquid or a solid.

In some embodiments of the present invention, the target material is partially or completely wrapped by the carbon material.

Specifically, it can be ensured that the carbon material wraps the target material by the porous microstructure of the carbon material (some carbon materials, such as glassy carbon, contain closed holes inside, and the target material enters and fills the holes through high-pressure driven diffusion) or by controlling the volume ratio of the carbon material and the target material involved in the mixing (the volume of the carbon material is much higher than that of the target material, for example, the volume ratio is 30:1).

In some embodiments of the present invention, the high-pressure device is a diamond anvil cell, a large volume press and other devices that can generate high temperature and high pressure.

According to the method for preparing a high-pressure state material that can be detached from a high-pressure device provided by the present invention, the carbon material and the target material are mixed before being placed into the sample chamber of the high-pressure device: or, the carbon material and the target material are placed into the sample chamber of the high-pressure device, and then mixed.

According to the method for preparing a high-pressure state material that can be detached from a high-pressure device provided by the present invention, the high-pressure state material is in a state that the target material is at a pressure greater than 1 atmospheric pressure. That is, the target material is in a state that the high-pressure state material is at atmospheric pressure.

In a preferred embodiment of the present invention, the method for preparing the high-pressure state material that can be detached from the high-pressure device including the following steps:
  placing a carbon material and a target material into the sample chamber of a high-pressure device and mixing, or placing a mixture of a carbon material and a target material into the sample chamber of a high-pressure device;
  subjecting the carbon material and the target material to high-temperature and high-pressure treatment: the high-temperature and high-pressure treatment is performed at a pressure of 5 to 100 GPa and a temperature of 400 to 3000° C.;
  obtaining a diamond high-pressure chamber containing a high-pressure state material inside after cooling down and depressurizing.

It should be noted that in the description of this specification, the terms "an embodiment", "some embodiments", "example(s)", "specific example(s)" or "some example(s)" means that the specific features, structures, materials or characteristics described in connection with this embodiment or example are included in at least one embodiment or example of the example of the present invention. In this specification, the schematic expressions of the above terms do not necessarily refer to the same embodiment or example. Furthermore, the specific features, structures, materials or characteristics described may be combined in any one or more embodiments or examples in a suitable manner. In addition, a person skilled in the art can combine and constitute different embodiments or examples and features of different embodiments or examples described in this specification without contradicting each other.

The present invention provides a method for preparing a high-pressure state material that can be detached from a high-pressure device. By preparing a diamond high-pressure chamber containing a high-pressure state material inside, it solves the problem that the pressure state, high-pressure structure and physical properties of materials cannot be separated from the high-pressure device for preservation, thus enabling the study and application of high-pressure state materials in an atmospheric pressure environment.

SPECIFIC MODES FOR CARRYING OUT THE EMBODIMENTS

In order to make the purpose, technical solutions and advantages of the examples of the present invention clearer, the technical solutions in the examples of the present invention are described clearly and completely below. Obviously, the described examples are part of the examples of the present invention, and not all of them. Based on the examples in the present invention, all other examples obtained by a person skilled in the art without making creative labor fall within the scope of the present invention.

Unless otherwise specified, the raw materials involved in the examples of the present invention are all commercially available.

The glassy carbon used in the following examples is produced by Alfa Aisha Co., Ltd., and the graphite powder, fullerene powder, sodium chloride powder and potassium chloride powder used are produced by Aladdin Company.

Example 1

The present Example provides a method for preparing a high-pressure state material that can be detached from a high-pressure device, the specific steps are as follows:
  glassy carbon was cut into small pieces of 50 microns each in length and width and 15 microns in thickness, and placed into the sample chamber of a diamond anvil cell. The sample chamber was filled with argon gas by a high-pressure gas-loading system with a pressure of 21,000 psi. The pressure of the diamond anvil cell was raised to 50 GPa, heated to 1800° C. and held for 3 minutes, and a diamond high-pressure chamber with high-pressure crystalline argon wrapped inside was obtained.

Figure 1:
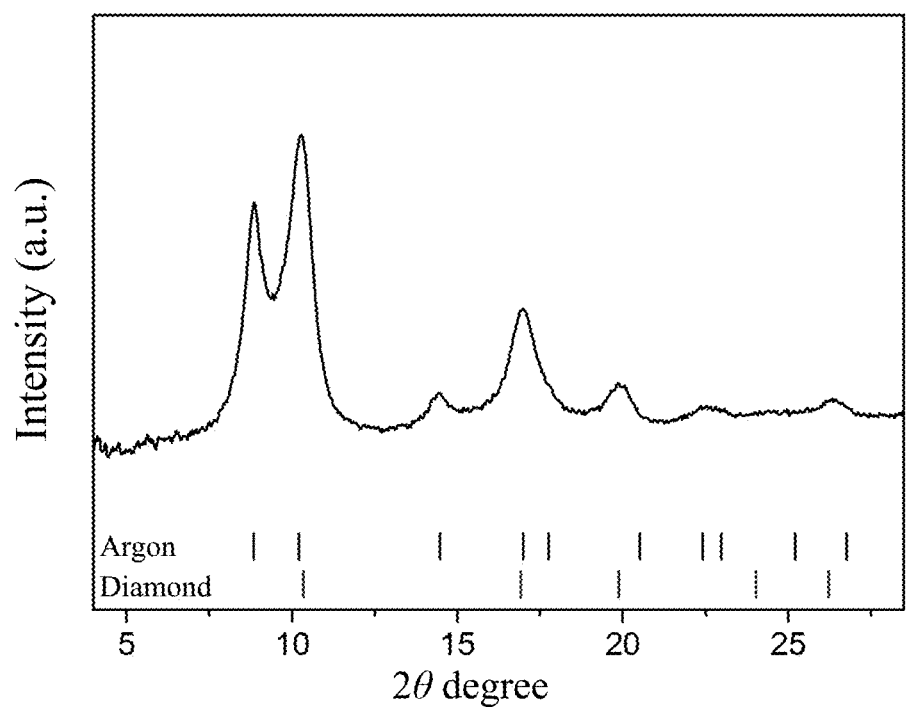
FIG. 1 is an X-ray diffraction diagram of a diamond high-pressure chamber containing a high-pressure state material inside obtained in Example 1 of the present invention.
Figure 2:
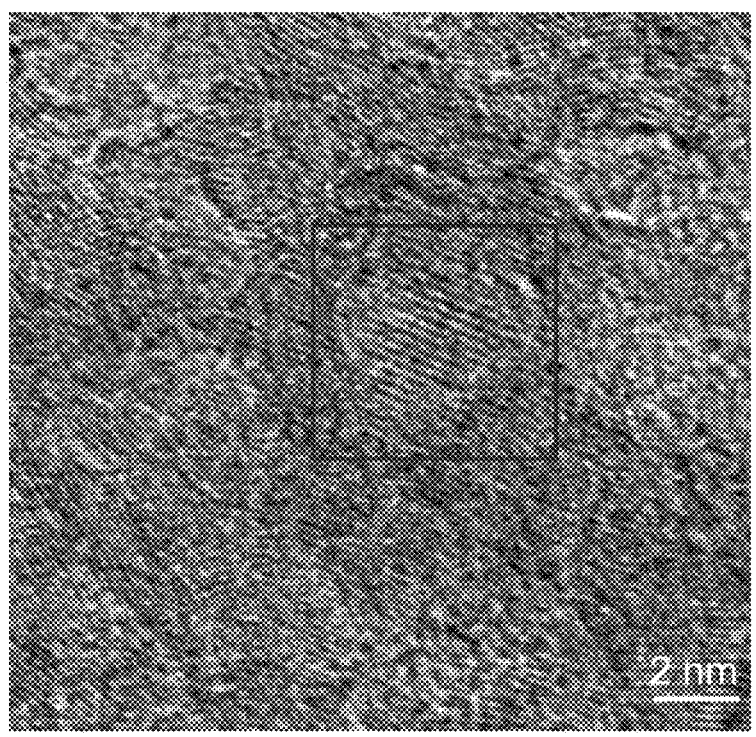
FIG. 2 is a transmission electron microscope image of a diamond high-pressure chamber containing a high-pressure state material inside obtained in Example 1 of the present invention, with high-pressure argon grains marked in the box.

The result of synchrotron radiation X-ray diffraction of the synthesized sample is shown in FIG. 1, indicating that the sample contains diamond and high-pressure crystalline argon with lattice constant of 4.2 Å (corresponding to the pressure of high-pressure argon of about 22 GPa). The synthesized diamond hyperbaric chamber sample was analyzed by a high-resolution electron microscope. The result is shown in FIG. 2, indicating that the sample is diamond and diamond-wrapped high-pressure crystalline argon with an average (111) crystal plane spacing of about 2.5 Å.

Example 2

The present Example provides a method for preparing a high-pressure state material that can be detached from a high-pressure device, the specific steps are as follows:
  glassy carbon was cut into small pieces of 50 microns each in length and width and 20 microns in thickness, and placed into the sample chamber of a diamond anvil cell. Liquid argon was injected into the sample chamber of the high-pressure device by a low-temperature device at atmospheric pressure. Then, the pressure of the diamond anvil cell was raised to 35 GPa, heated to 1900° C. and held for 1 minute, and a diamond high-pressure chamber sample with high-pressure crystal argon wrapped inside was obtained.

Figure 3:
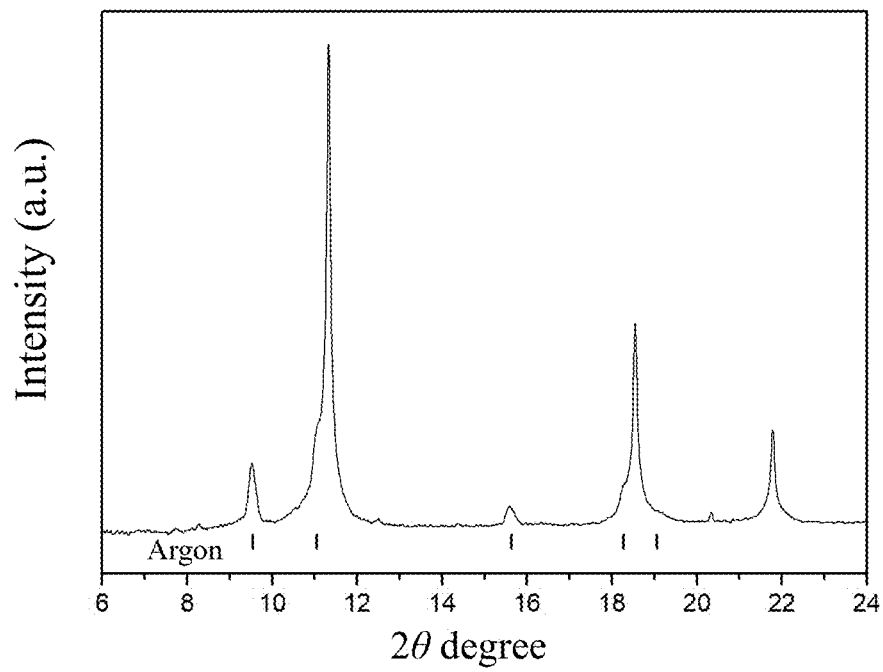
FIG. 3 is an X-ray diffraction diagram of a diamond high-pressure chamber containing a high-pressure state material inside obtained in Example 2 of the present invention.

The result of synchrotron radiation X-ray diffraction of the synthesized sample is shown in FIG. 3, indicating that the sample contains diamond and high-pressure crystalline argon.

Example 3

The present Example provides a method for preparing a high-pressure state material that can be detached from a high-pressure device, the specific steps are as follows:

glassy carbon was cut into small pieces of 40 microns each in length and width and 10 microns in thickness and placed into the sample chamber of a diamond anvil cell. The sample chamber was filled with neon by a high-pressure gas-loading system with a pressure of 23,000 psi. The pressure of the diamond anvil cell was raised to 49 GPa, heated to 1700° C. and held for 1 minute, and a diamond high-pressure chamber with high-pressure crystalline neon wrapped inside was obtained.

Figure 4:
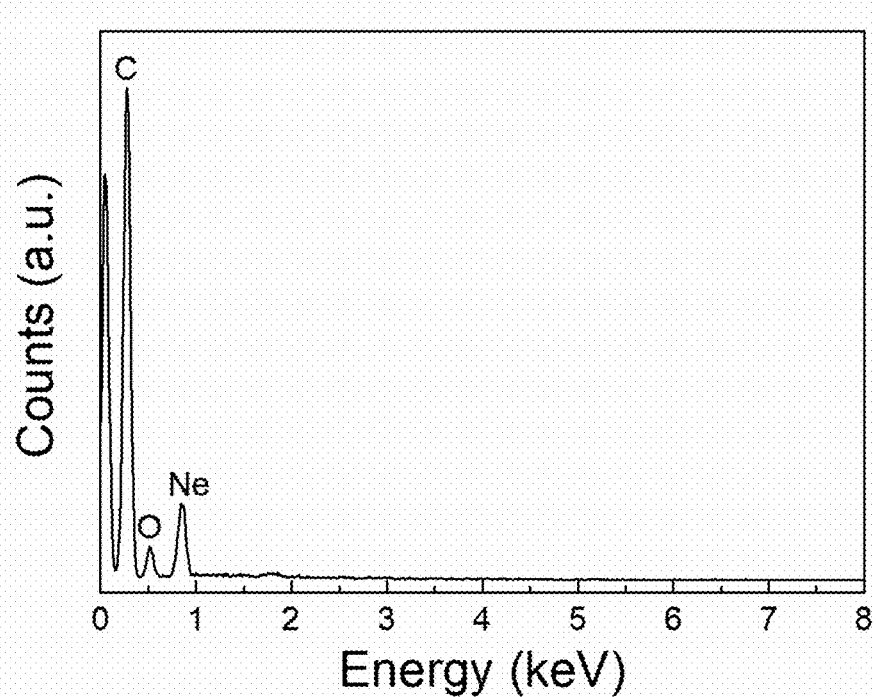
FIG. 4 is a scanning electron microscope energy spectrum of a diamond high-pressure chamber containing a high-pressure state material inside obtained in Example 3 of the present invention.

The composition of the synthesized sample was analyzed by scanning electron microscope energy spectrum test, and the result is shown in FIG. 4, indicating that the composition of the sample are mainly two elements, carbon and neon.

Example 4

The present Example provides a method for preparing a high-pressure state material that can be detached from a high-pressure device, the specific steps are as follows:

graphite powder (99.95% purity) and sodium chloride powder (99.99% purity) were mixed evenly according to the molar ratio of 30:1, pressed into small pieces of about 100 microns in diameter and 20 microns in thickness, and placed into the sample chamber of a diamond anvil cell. Above and below the sample, a thin flake of magnesium oxide with a thickness of about 10 microns was placed. The pressure of the diamond anvil cell was raised to 40 GPa, heated to 1800° C. and held for 5 minutes to obtain a diamond high-pressure chamber with high-pressure sodium chloride wrapped inside.

The diamond high-pressure chamber with high-pressure sodium chloride wrapped inside can be removed from the high-pressure device, which is convenient for the study and application of high-pressure sodium chloride.

Example 5

The present Example provides a method for preparing a high-pressure state material that can be detached from a high-pressure device, the specific steps are as follows:

fullerene powder (purity 99.9%) and potassium chloride powder (purity 99.99%) were evenly mixed according to the molar ratio of 2:1, pressed into small pieces of about 100 microns in diameter and 20 microns in thickness, and placed into the sample chamber of a diamond anvil cell. Above and below the sample, a thin flake of magnesium oxide with a thickness of about 10 microns was placed. The pressure of the diamond anvil cell was raised to 25 GPa, heated to 1500° C. and held for 10 minutes, and a diamond high-pressure chamber with high-pressure potassium chloride wrapped inside was obtained.

The diamond high-pressure chamber with high-pressure potassium chloride wrapped inside can be removed from the high-pressure device, which is convenient for the study and application of high-pressure potassium chloride.

Finally, it should be noted that the above examples are only used to illustrate the technical solutions of the present invention, and not to limit them: although the present invention has been described in detail with reference to the foregoing examples, it should be understood by a person skilled in the art that it is still possible to modify the technical solutions described in the foregoing examples, or to make equivalent substitutions for some of the technical features thereof: and these modifications or substitutions do not make the nature of the corresponding technical solutions deviate from the spirit and scope of the technical solutions of various examples of the present invention.

INDUSTRIAL APPLICABILITY

The present invention provides a method for preparing a high-pressure state material that can be detached from a high-pressure device, the method comprising: placing a carbon material and a target material into a high-pressure device, and subjecting the resultant to high-temperature and high-pressure treatment to obtain a diamond high-pressure chamber containing a high-pressure state material inside. The present invention enables the high-pressure state material (including the substance and its pressure state) to be preserved inside the diamond high-pressure chamber by mixing the carbon material and the target material and placing into the sample chamber of a conventional high-pressure device, and then transforming the carbon material into diamond using the high-temperature and high-pressure treatment. The diamond high-pressure chamber can be separated from the conventional high-pressure device and maintain the high-pressure state inside, thus allowing the high-pressure material to be studied and applied in an atmospheric pressure environment, and has good economic value and application prospects.

What is claimed is:

1. A method for preparing a high-pressure state material that can be detached from a high-pressure device, characterized by comprising: placing a carbon material and a target material into a high-pressure device, and subjecting the carbon material and target material to a high-temperature and high-pressure treatment to obtain a diamond high-pressure chamber containing a high-pressure state material inside.

2. The method for preparing a high-pressure state material that can be detached from a high-pressure device according to claim 1, wherein, the high-temperature and high-pressure treatment is performed at a pressure of 5 to 100 GPa and a temperature of 400 to 3000° C.

3. The method for preparing a high-pressure state material that can be detached from a high-pressure device according to claim 2, wherein the high-pressure state material is in a state that the target material is at a pressure greater than 1 atmospheric pressure.

4. The method for preparing a high-pressure state material that can be detached from a high-pressure device according to claim 2, wherein the high-temperature and high-pressure treatment is performed at a pressure of 25 to 50 GPa, a temperature of 1500 to 2000° C. and for a holding time of 1 to 20 minutes.

5. The method for preparing a high-pressure state material that can be detached from a high-pressure device according to claim 4, wherein the high-pressure state material is in a state that the target material is at a pressure greater than 1 atmospheric pressure.

6. The method for preparing a high-pressure state material that can be detached from a high-pressure device according to claim 1, wherein the carbon material is one or more of graphite, carbon black, glassy carbon, graphene, fullerene, carbon nanotube, amorphous carbon, diamond and diamondoid.

7. The method for preparing a high-pressure state material that can be detached from a high-pressure device according to claim 6, wherein the high-pressure state material is in a state that the target material is at a pressure greater than 1 atmospheric pressure.

8. The method for preparing a high-pressure state material that can be detached from a high-pressure device according to claim 1, wherein the target material is a gas, a liquid or a solid.

9. The method for preparing a high-pressure state material that can be detached from a high-pressure device according to claim 8, wherein the high-pressure state material is in a state that the target material is at a pressure greater than 1 atmospheric pressure.

10. The method for preparing a high-pressure state material that can be detached from a high-pressure device according to claim 8, wherein the target material is partially or completely wrapped by the carbon material.

11. The method for preparing a high-pressure state material that can be detached from a high-pressure device according to claim 10, wherein the high-pressure state material is in a state that the target material is at a pressure greater than 1 atmospheric pressure.

12. The method for preparing a high-pressure state material that can be detached from a high-pressure device according to claim 1, wherein the high-pressure device is a diamond anvil cell or a large volume press.

13. The method for preparing a high-pressure state material that can be detached from a high-pressure device according to claim 12, wherein the high-pressure state material is in a state that the target material is at a pressure greater than 1 atmospheric pressure.

14. The method for preparing a high-pressure state material that can be detached from a high-pressure device according to claim 1, wherein the carbon material and the target material are mixed before being placed into the sample chamber of the high pressure device; or, the carbon material and the target material are placed into the sample chamber of the high pressure device, and then mixed.

15. The method for preparing a high-pressure state material that can be detached from a high-pressure device according to claim 14, wherein the high-pressure state material is in a state that the target material is at a pressure greater than 1 atmospheric pressure.

16. The method for preparing a high-pressure state material that can be detached from a high-pressure device according to claim 1, wherein the high-pressure state material is in a state that the target material is at a pressure greater than 1 atmospheric pressure.

17. A method for preparing a high-pressure state material that can be detached from a high-pressure device, characterized by comprising:

placing a carbon material and a target material into a sample chamber of a high-pressure device and mixing, or placing a mixture of the carbon material and the target material into the sample chamber of the high-pressure device;

subjecting the carbon material and the target material to a high-temperature and high-pressure treatment; wherein the high-temperature and high-pressure treatment is performed at a pressure of 5 to 100 GPa and a temperature of 400 to 3000° C.; and obtaining a diamond high-pressure chamber containing a high-pressure state material inside after cooling down and depressurizing.

* * * * *